United States Patent Office 3,486,560
Patented Dec. 30, 1969

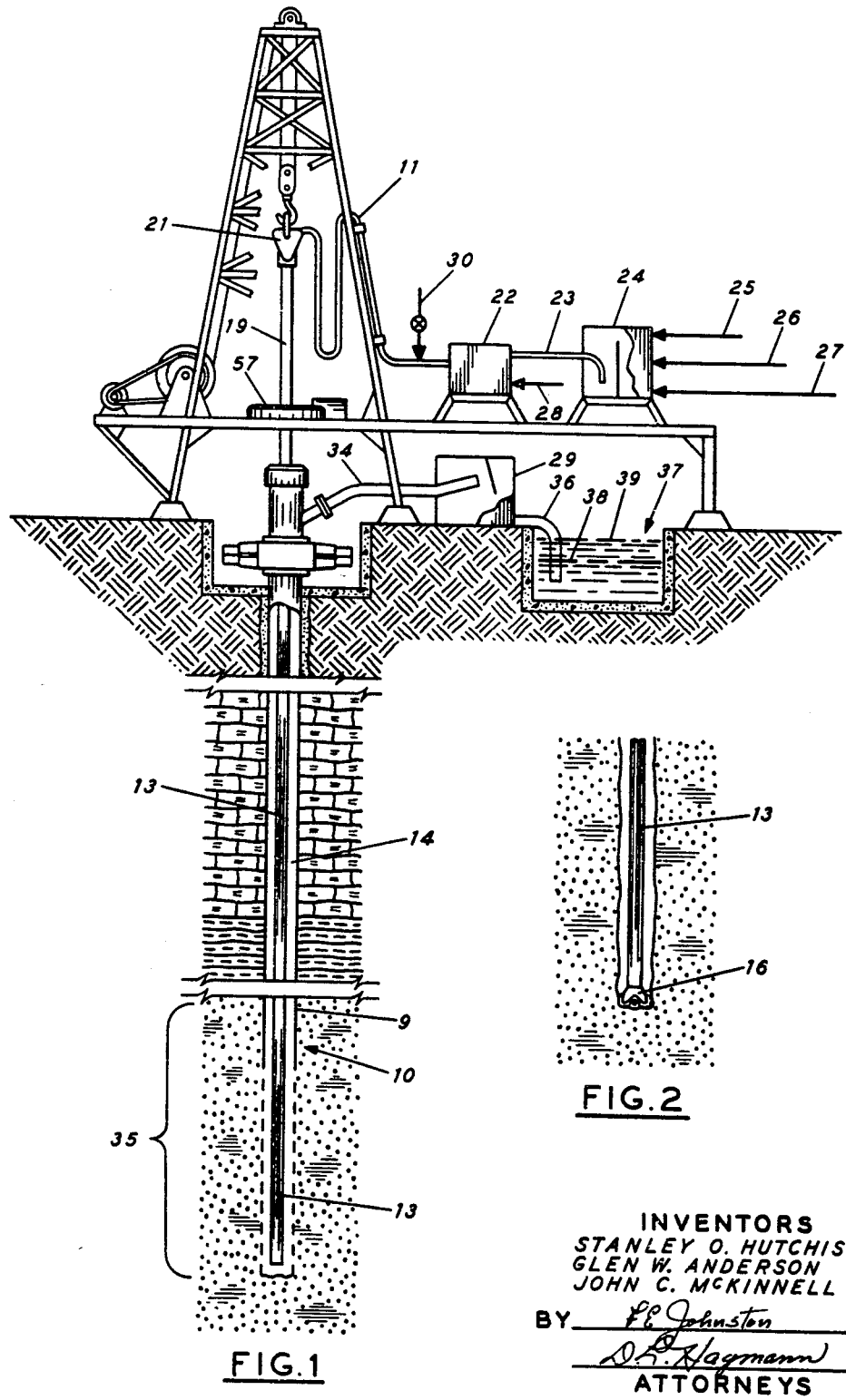

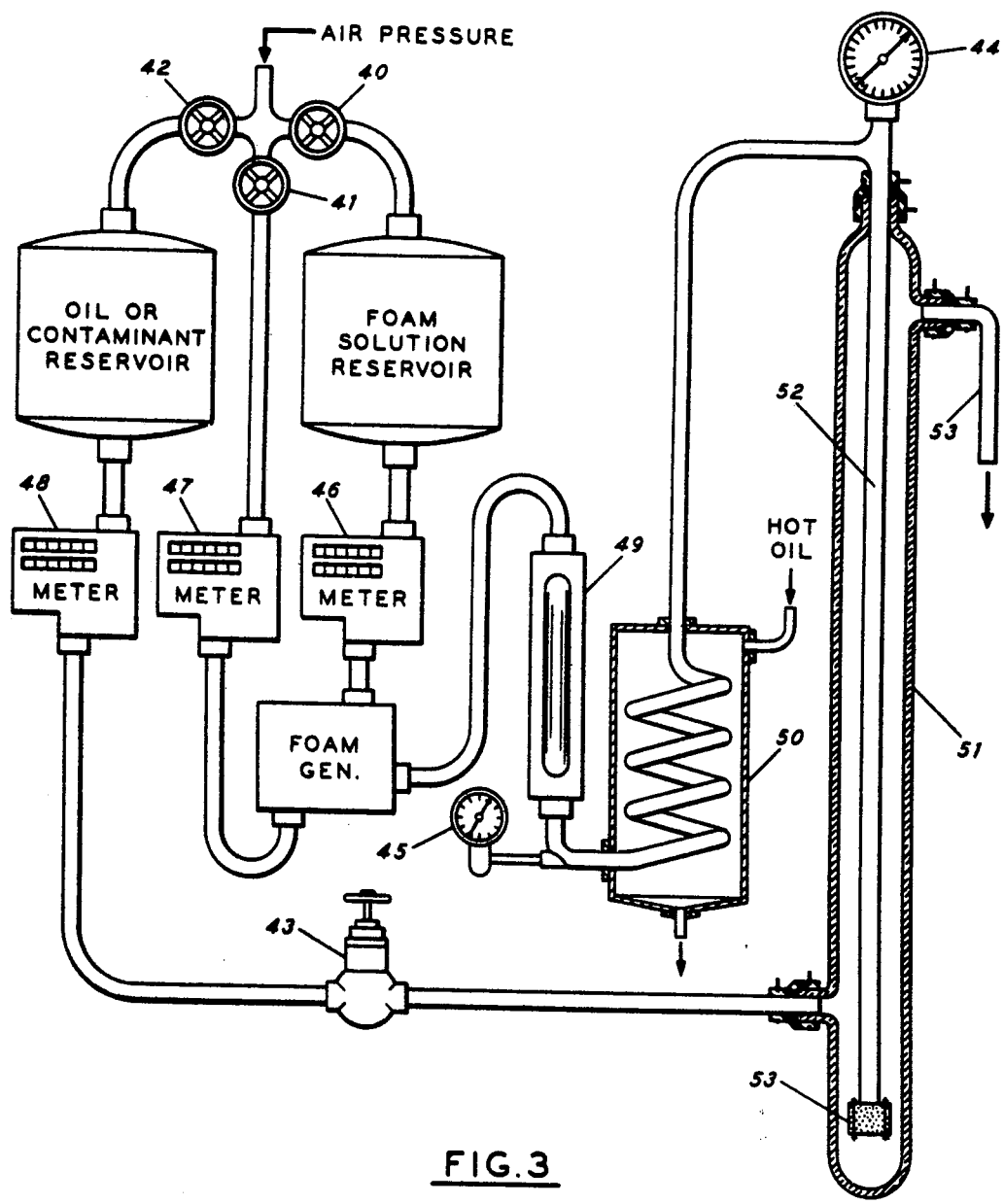

3,486,560
AMMONIATED FOAMED WELL CIRCULATION FLUIDS AND USES THEREOF
Stanley O. Hutchison, Bakersfield, Glen W. Anderson, Oildale, and John C. McKinnell, Taft, Calif., assignors to Chevron Research Company, San Francisco, Calif., a corporation of Delaware
Filed Apr. 12, 1968, Ser. No. 720,977
Int. Cl. E21b 7/18, 33/00
U.S. Cl. 166—292
40 Claims

ABSTRACT OF THE DISCLOSURE

Preformed foams having improved performance characteristics as well circulation fluids are obtained when the foam contains a minor amount of unneutralized ammonia.

---

This invention relates to well circulation fluids. More particularly, it relates to improved low density, low velocity well completion and cleanout fluids. Still more particularly, it relates to preformed aqueous gas-in-liquid foams having improved flow characteristics for use as circulation fluids in wells.

It is known to use drilling muds, air, as in air-drilling, or air-foam combinations, as in air or mist drilling, as circulation fluids in the drilling or maintenance of a well. These methods have limitations and undesirable features peculiar to each. Drilling muds are in general high-density materials which require substantial expenditure of energy for circulation. In well drilling, etc., they are also required in large amounts. They are relatively costly. Air drilling, on the other hand, involves a very low-density circulation fluid, i.e., a gas, but circulation velocities are high, i.e., of the order of 1,000 to 3,000 feet per minute. Hole enlargements from scouring and erosion as well as other disadvantages are experienced in this type of well operation.

In our copending application, Ser. No. 704,832, filed Feb. 12, 1968, we have disclosed a method wherein preformed foams may be used as circulation fluids in a well. In the circulation of these foams far less energy is required than in the circulation of conventional low velocity circulation fluids such as drilling muds and the like. Nevertheless, it is desirable to yet further reduce this work requirement. Another object is to improve foam stability characteristics in relation to circulation under heavy duty use conditions.

It has now been found that the incorporation of from about 0.05 to 10 parts of unneutralized ammonia per 100 parts by weight of a circulatable gas-in-liquid foam substantially reduces the energy requirement when the foam is used as a circulation fluid in a well. Other advantages, including foam stabilization effects, accrue from the presence of unneutralized ammonia in the instant foams. These and other advantages will be clear from the following disclosure.

By aqueous gas-in-liquid well circulation foams, i.e., circulatable foams, is meant foams prepared by the mechanical mixing of a gas and an aqueous solution containing in parts by weight for each 100 parts of solution from about 0.005 to 10 parts of an organic foaming agent and which have a gas-to-liquid volume ratio, standard cubic feet per gallon, respectively, in the range from about 3 to 50.

By a preformed foam is meant a foam which is generated out of contact with solids and/or liquids naturally encountered in a well bore, i.e., a foam formed out of contact with contaminants associated with a wellbore environment including cuttings, oil, brine, and the like.

By unneutralized ammonia is meant ammonia plus hydrated ammonia, i.e., $NH_3$ and $NH_4OH$, in excess of amonium salt forming-acid which may be present in the generated foam. For convenience herein, foams containing unneutralized ammonia are referred to as ammoniated foams.

By a Ross-Miles initial foam height as used herein after is meant the initial or zero-time foam height as obtained in the standard Ross-Miles foam analysis method (cf. Ross, J., and Miles, G. D., "An Apparatus for Comparison of Foaming Properties of Soaps and Detergents," Oil and Soap, vol. 18, 1941, pp. 99–102, and McCutcheon, J. W., "Synthetic Detergents," McNair-Dorland Co., New York, N.Y., 1950, p. 435).

By a cumulative foam height as used hereinafter is meant the sum of the foam heights at the 0-, 1-, 2-, 5- and 10-minute intervals as obtained in the Ross-Miles method.

The subject foams are, in general, useful well circulation fluids provided annular velocities in the well are not excessive, i.e., in general, less than about 600–800 feet per minute. They are useful as low-velocity carriers for the removal of solids and/or liquids from a well bore, including use as in drilling and/or cleaning or the like of a well. The low-density foams herein are relatively easy to circulate. They are relatively inexpensive to produce. These and other advantages will be appreciated and understood from the description and examples to follow.

Surprisingly, the presence of minor amounts of unneutralized ammonia greatly improves gas-in-liquid foam performances in many respects, including a reduction of back pressure generated when a foam is pumped in a well bore, well annulus or pipe string. Unneutralized ammonia appears to stabilize gas-in-liquid foams with respect to mechanical shock, temperature and flow effects. Conventional heavy-duty foams which are unpumpable for practical reasons are rendered pumpable by the addition of a minor amount of unneutralized ammonia and such foams become useful well circulation fluids. Unneutralized ammonia has a further unexpected and useful effect upon a circulation foam in that, by varying the relative amount of the unneutralized ammonia, a relatively wet or dry foam is produced. Depending upon the circumstances in a well and the job to be done, the ability to generate a wet or dry foam at will and conveniently is advantageous.

The ammonia-modified foams of the present invention are useful as circulation fluids in wells in general. Representative specific uses for these foams are in the drilling of a well, in removing solids or liquids from a well, in scrubbing or cleaning a well, in fracturing the producing formation surrounding an oil or gas well, in secondary recovery as in a foam drive, in increasing flow rate from a water-logged oil or gas well, and the like. These and other uses will be evident in the light of the descriptions to follow.

FIG. 1 is a diagrammatic view illustrating an arrangement of the apparatus used in the preferred embodiment of the invention. FIG. 2 illustrates a variation of the preferred embodiment. FIG. 3 is a diagrammatic representation of a laboratory foam testing unit.

In a preferred embodiment of the instant invention, an ammoniated foam is used as a working fluid in a well stimulation operation as shown in FIG. 1. This figure is a diagrammatic view and illustrates an arrangement of apparatus assembled for use in accordance with one aspect of the invention.

Referring now to FIG. 1, a well 10 is shown penetrating the earth into an unconsolidated oil-producing formation 35. Debris has accumulated in the well bottom during the use of the well in recovering crude oil from the formation. It has choked the well bottom such that effective production is no longer possible. Using a rotary drill table 57, Kelley bar 19 and swivel 21 or other suitable wellhead devices, a pipe string 13 made up of a sufficient number of inter-connected pipe sections is lowered into the well by suitable means down into the upper portion of the producing zone 35.

An ammoniated aqueous gas-in-liquid foam is then introduced into the well from foam generator 22 via line 11 through Kelley bar 19 and swivel 21, down string 13, out the end of the pipe string 13, and into the well bottom. If the end of string 13 is below the surface of a column of liquid, i.e., crude oil and/or water, brine, etc., or if the end of the string is penetrated into an accumulation of sand, tar, etc., the foam carries the liquid or debris away in a slug flow or by entrainment up the annulus 14 of the well, out of the well via line 34 and into the foam breaker or blooie box 29 and thence via line 36 to sump 37 wherein liquid phase separation occurs yielding aqueous phase 38 and oil phase 39.

Where little or no penetration of the producing formation by the foam is desired, sufficient pressure is applied via line 28 to ensure formation of foam in generator 22 and delivery of the foam to the bottom of the well and around the turn at the end of string 13 where the natural pressure of the well or a small additional pressure via line 28 drives the foam to the surface.

Sequentially after the portion of the well bottom in the vicinity of the terminus of the pipe string 13 has been worked, and treated by the foam, the string can be lowered until all, or part, of the well bottom has been treated and/or cleaned out.

For the generation of aqueous gas-in-liquid foams as in the aforedescribed embodiment, water, a detergent concentrate and a concentrated aqueous ammonia solution or ammonia gas are delivered to mixer 24 via lines 25, 26 and 27, respectively, at rates sufficient to produce in mixer 24 a foamable solution which contains in parts by weight, for each 100 parts thereof, about 0.1–1 part of an organic foaming agent, for example, the sodium salt of a linear $C_{12}$–$C_{16}$ alkylbenzene sulfonic acid mixture, and which contains from about 0.5 to 1 part (weight) of unneutralized ammonia. Via lines 23 and 28 said foamable solution and a gas, for example, air, respectively are delivered to foam generator 22 wherein a foam having a gas-to-liquid volume ratio (c.f./gal.) in the range 3 to 50 is generated and delivered to the well under a pressure sufficient to circulate the foam in the well via line 11, at a rate of 10–300 feet per minute velocity up the pipe string annulus 14 as described above, i.e., at a minimum of about 5 to 100 p.s.i.g. above the bottom-hole pressure. If desired, via line 30 diesel oil and the like may be introduced to line 11 for delivery (slug flow) to the well as for scrubbing. Bypass and foam recirculation lines are not shown in FIG. 1.

A variation of the preferred embodiment is illustrated in FIG. 2. In this case a well is being drilled and a suitable cutting bit, for example, a rotary bit 16, is shown attached to the end of drillstring 13. The foam is circulated as described above and in its transit out the end of the drillstring 13 it passes through the cutting area, cooling the bit and entraining cuttings, loosened solids and liquids. These are carried to the surface via the annulus as described above.

In the aforedescribed manner sand, dust, larger solids, oil, brine, fresh water and the like can be readily removed from shallow or deep wells. Surprisingly, rocks as large os 2–3 inches in diameter have been readily carried to the surface by the instant foams from depths as much as 5,000 feet and deeper. By analogous means wells have been produced using the instant foams in lieu of conventional pumps. Other advantages will be clear from the examples and descriptions herein.

Gas-in-liquid foam generations well known in the art (cf. "Encyclopedia of Chemical Technology," vol. 6, Interscience Encyclopedia, Inc., N. Y. (1951); U. S. 3,212,762). Large volumes and a ready supply of foam are required for the practice of the instant invention. An eductor or venturi type nozzle arrangement followed by a few downstream in-line mixing baffles has been found to yield satisfactory gas-in-liquid foams and is the preferred mode for use herein. In the production of the subject ammoniated foams, an inert, i.e., nanacidic, gas such as air, nitrogen, methane, natural gas, propane, and the like, and mixtures thereof are used. Nitrogen and air are preferred. Similarly, while the liquid component in a gas-in-liquid foam system is known to be variable and includes hydrocarbons, alcohols, water, etc., water is preferred for reasons of cost. Rather amounts of the liquid are required in the practice of the present invention, making cost a critical factor. Preferably aqueous gas-in-liquid foam systems are contemplated as is likewise the generation of the foam circulation fluids by mechanical means. The method of addition of ammonia to the foam system herein is not critical. Ammoniacal solutions or gaseous ammonia may be introduced into the foam generator. Gaseous ammonia, if desired, may also be mixed into a preformed foam in a mixing chamber. The preferred means is to have the desired amount of ammonia present in the foamable solution prior to foam generation.

For satisfactory operation in the instant invention, the foam in general must be preformed. Once formed, the subject foam systems have stabilizing characteristics which render them resistant to deleterious agents and influences ordinarily encountered in well bores and which, when present as an impurity during the generation of the foam, may, and usually does, inhibit useful foam production.

The ammoniated foams of the instant invention are dynamic systems capable of adjusting to and surival from deleterious circumstances, for example mechanical shock, relatively high temperature, and the like. In a well bore, in general, the subject foams are satisfactory circulation fluids at annular velocities as high as about 300–500 feet per minute and even at a somewhat high velocity—possibly as much as 600–800 feet per minute. The subject foams are useful well circulation fluids at temperatures normally encountered in a well bore. They are stable under ordinarily minimal practical well circulation annular velocities (10–30'/min.) and even at a negligible annular velocity (0–10'/min.) for useful periods of time, for example, when used as a thermal insulator between the annulus and a central steam line in a high-temperature steam treatment of a well (i.e., keeps casing cool enough to obviate excessive temperature differentials and casing failures). Preferably, in the present method, foam well bore annular flow velocities should be in the range from about 5–300 feet per minute.

The amount of ammonia required for the purposes of the present invention varies. In general, at least enough ammonia must be present such that for 100 parts by weight of foamable solution at least about 0.05 part by weight of unneutralized ammonia is present. That is, the amount of ammonia or hydrated ammonia present in the foam must exceed the amount of acid capable of forming a salt with ammonia which may be present by at least about 0.05 part per 100 parts of solution. Larger relative amounts of unneutralized ammonia are beneficial, making the foam less resistant to flow and more stable towards mechanical shock or temperature effects. The presence of unneutralized ammonia in excess of about 2–5 parts, or even as much as 10 parts, per 100 parts of solution in general does not appear to appreciably enhance the above desired foam characteristics. On the other hand, excess ammonia, aside from a cost factor, does not appear to be detrimental and may be desirable, for example, where an acidic, noxious gas such as hydrogen sulfide is being vented into the well from the surrounding formation(s). The excess ammonia neutralizes the hydrogen sulfide, preventing hydrogen sulfide contamination of the atmosphere at the sump and ensures a safe working environment at the well head.

Where the circumstances are such that determination of the relative amount of unneutralized ammonia is difficult or impracticable, the addition of sufficient ammonia to the formable solution to yield a pH in the range from about 7.5–8.5 is usually adequate. Where a weakly acidic material is also present in the foamable solution, a higher pH, i.e., of the order of 8–9, is usually adequate. Preferably, the amount of unneutralized ammonia should be in the range of 0.1–1 part per 100 parts, i.e., an appreciable stoichiometric excess of unneutralized ammonia.

Organic foaming agents are, in general satisfactory for use in the instant invention; and these in general yield improved well circulation fluids when they contain sufficient unneutralized ammonia. Organic foaming agents in general which have a Ross-Miles initial foam height of at least 10 centimeters and a cumulative foam height of at least 30 centimeters [ASTM D1173–53 (1965); also see Bureau of Mines, Monograph 11, by H. N. Dunning, J. L. Eakin and C. J. Walker, pp. 11–14] at the concentration being used, are preferred for use in the present invention.

The relative amount of foaming agent required to produce a satisfactory circulatable foam varies depending upon the particular agent being used and the gas-to-liquid volume ratio for the foam. In general, in parts by weight per 100 parts of foamable solution, the amount to be used is in the range from about 0.005 to 1. Larger amounts of foaming agent can also be used, but such is relatively inefficient in view of cost, particularly at concentrations in excess of about 2–5 parts per 100.

Elastic foams are preferred herein. These foams, in general, are better able to endure the vicissitudes of a well bore passage and yet function effectively as a circulation fluid. In general, for a given foaming agent, there is an optimum concentration range (roughly in the range when the solution contains from about 0.1 to 0.5 part per 100) at which the agent yields its most elastic foam. In this range, the change of solution surface tension per change in foaming agent concentration is relatively large. This range is also known as the reversible surface tension range. Foamable solutions having foaming agent concentrations which are intermediate concentrations within this range yield, in general, the most satisfactory foamed well circulation fluids.

Satisfactory well circulation foams have, in general, a gas-to-liquid volume ratio (standard cubic feet per gallon, respectively) in the range from about 3 to 50, respectively, preferably in the range from about 5 to 20. For extra heavy duty usage, foams having a ratio as low as 1–2 may be satisfactory. These foams have a relatively high density and tend to be more difficult to circulate, i.e., have a higher work requirement. On the other hand, with increasing gas-to-liquid ratios, bubble sizes are relatively larger and foam characteristics, including stability under conditions of flow in a well, become progressively poorer.

By organic foaming agents is meant organic compounds in general whose solutions form foam when a gas is bubbled through the solution, including anionic, cationic, amphoteric and nonionic surface active agents, and mixtures thereof. (See for example "Detergents and Emulsifiers," 1966 Annual, John W. McCutcheon, Inc., also "Surface Active Agents," Volumes I and II, A. M. Schwartz, J. W. Perry and J. Berch, Interscience Publishers, Inc., New York (1949 and 1958).)

Anionic forming agents are preferred for use in the preparation of the subject ammoniated foamed well circulation fluids. Of these agents, the anionic surfactants of the formula $$R(O)_nSO_3M$$

in which R represents an oleophilic radical, M represents the ammonium or an alkali metal cation and $n$ is zero or 1, are preferred for use herein. They yield foams which are especially benefitted when used as well circulation fluids by the presence of unneutralized ammonia. The oleophilic radical R may be a hydrocarbon radical containing from about 8 to 20 carbon atoms or a radical of the formula $R'O(CH_2CH_2O)-_m$ in which R' is an oleophilic hydrocarbon radical containing from about 8 to 18 carbon atoms and $m$ is a whole number in the range from 1 to about 15, preferably 3 to 10, inclusive.

Hydrocarbon radicals in general having the specified carbon atom content are contemplated as groups R or R' in the formulas above. Representative classes include such radicals as alkyl, cycloalkyl, aryl, alkylaryl, alkenyl, alkylcycloalkyl, alkenylcycloalkyl, alkenylaryl, arylalkenyl, and the like radicals. Preferred hydrocarbon radicals are the aliphatic or alkylaryl hydrocarbon radicals.

Representative preferred classes of foaming agents useful in the instant invention include the alkylbenzene sulfonates, the paraffin sulfonates, the alpha-olefin sulfonates, the internal olefin sulfonates, and the like, i.e., where $n$ of the above formula is zero and the foaming agent has the formula $RSO_3M$ and R and M are defined as stated above. Of these foaming agents, the class of alpha-olefin sulfonates are particularly preferred. These materials are a complex mixture of compounds which yield an ammoniated foam which is an especially effective well circulation fluid. In general, they yield foams which are dense and made up of relatively uniform small bubbles. The small bubble sizing appears to promote foam stability and to impart to them excellent circulation characteristics.

Similar to the alpha-olefin sulfonates, the sulfonates of the formula $R'O(CH_2CH_2O)_ySO_3M$ where $y$ is an integer in the range 3 to 10, inclusive, M is defined as above and R' is an alkyl radical containing from 8 to 18 carbon atoms, yield exceptional ammoniated well circulation foams.

By definition as used herein, by the term "alpha-olefin sulfonate" is meant the product mixture obtained at a reaction temperature in the range from about 10 to 60° C. from the reaction of an alpha-olefin, $RCH=CH_2$, where R is an alkyl radical of the $C_8$–$C_{18}$ range, with sulfur trioxide diluted by air with the product being neutralized and hydrolyzed using aqueous sodium hydroxide or an equivalent strong mineral base at a temperature in the range from about 50 to 130° C. (See for example "Alpha-Olefins in the Surfactant Industry" by T. H. Liddicoet, the American Oil Chemists Society, November 1963, volume 40, No. 11, pp. 631–636, and "Alpha Olefin Sulfonates from a Commercial $S_3$-Air Reactor" by D. M. Marquis et al., ibid, volume 43, No. 11, pp. 607–614 (1966).

The use of molecular mixtures of a given foaming agent species as well as individual molecular species of the aforedescribed organic foaming agents is contemplated. Mixtures which contain two or more foaming agent species are also contemplated. In particular, of the mixtures of foaming agent species, the alkylbenzene sulfonates and alpha-olefin sulfonates are preferred for use in the production of ammoniated foams in which each foaming agent species is in turn a molecular mixture, for example, a $C_{10}$–$C_{15}$-alkylbenzene sulfonate molecular mixture plus a $C_{14}$–$C_{18}$ alpha-olefin sulfonate mixture.

Representative foaming agents useful in the practice of the subject invention include sodium, potassium and ammonium polypropylene tetramer benzene sulfonate, polypropylene pentamer benzene sulfonate, n-dodecylbenzene sulfonate, s-tetradecylbenzene sulfonate, s-hexadecylbenzene sulfonate, and the like; lauryl sulfate, octadecyl sulfate, n-$C_{10}$-$H_{21}SO$—$_3$ n-$C_{10}$-$C_{15}SO_3$ mixtures; $C_{12}$-$C_{15}$-alpha-olefin sulfonate mixture, 1-dodecene-1-sulfonate, tetradecane-2-sulfonate; n-$C_8H_{15}(OCH_2CH_2)_3OSO$—$_3$; laurate, dodecanoate, and the like foaming agents.

Other representative foaming agents useful in the instant process include: ethanolated alkyl guanidine-amine complex, isopropyl naphthalene sodium sulfonate, dioctyl sodium sulfosuccinate, dicoco dimethyl ammonium chloride, tallow trimethyl ammonium chloride, fatty alcohol alkylolamine sulfate, condensation of hydrogenated tallow amide and ethylene oxide, modified fatty alkylolamide, ethylene cyclomido 1-lauryl, 2-hydroxy ethylene Na alcoholate, methylene Na carboxylate, lauric diethanolamide, fatty acid alkanolamide, condensation product of ethylene oxide with propylene glycol, C-cetyl betaine, polyoxyethylene alkyl aryl ether, sodium alkyl naphthalene sulfonate, alkyl aryl polyether alcohol, sorbitan monolaurate, sorbitan monopalmitate, sorbitan trioleate, polyoxyethylene sorbitan tristearate, polyoxyethylene sorbitan monooleate, octylphenoxyethanols, octylphenoxyethanols, octylphenoxyethaols, dioctyl sodium sulfosuccinate, modified phthalic glycerol alkyl resin, isoctyl phenyl polyethoxy ethanol (about 5 ethoxy groups per molecule).

FIG. 3 is a diagrammatic representation of a laboratory foam testing unit in which a preformed foam can be subjected to simulated well conditions. Valves 40, 41, 42 and 43 provide control of the unit as desired. Gauges 44 and 45 indicate line pressures, and meters 46, 47 and 48 permit determination of flow rates and quantities transported. Item 49 is a sight glass for viewing the generated foam. Item 50 is a heating coil and surrounding temperature control bath. Cylinder 51 is a heavy-duty glass unit in which the central delivery line 52 is analogous to a well pipe string. Detachable porous core 54 may be an oil sand core, and the annulus of cylinder 51 corresponds to a well annulus. Foam delivered via line 52 passes through core 54 or oil- and tar-contaminated sand as desired, or through oil or brine or mixtures thereof placed in the lower portion of cylinder 51, thence up the annulus and is extended via line 53. The effluent from line 53 is caught in a suitable vessel, i.e., a glass beaker, graduated cylinder, etc., and examined for foam condition, liquid or solid, conveyed by the foam from the "well" and the like.

The following examples further illustrate the invention claimed and described herein.

The following foam test examples were run in a laboratory test unit as described in FIG. 3 except that no core 15 was used. Air at 50 p.s.i.g. was employed in the runs. At a flow of 10 s.c.f./hr. the system back pressure was 1.5 p.s.i.g. The bath temperature was maintained at 210° F.–225° F., and the delivered foam had a temperature in the range 142–150° F.

EXAMPLE 1

In a foam test apparatus substantially as described in FIG. 3 except that sand core 53 was omitted, foams were generated and tested. At ambient temperature (ca. 22° C.), a pressure head of 50 p.s.i.g. and a flow rate of 10 standard cubic feet per hour, the apparatus back pressure was 1.5 p.s.i.g. (i.e., apparatus constant). When the bath temperature, heat exchanger 50, was maintained at 210° F., the delivered foam had a temperature in the range 142° F.–150° F.

Under the above test conditions, the effect of the presence of unneutralized ammonia in a foam upon foam flow was demonstrated by comparing back pressures generated by foams with and without ammonia addition. Foams were prepared in each case having a wide range of gas to liquid ratio, standard cubic feet of gas per gallon of aqueous liquid. The foaming agent used was a linear sodium alkylbenzene sulfonate (LAS) mixture of $C_{10}$–$C_{15}$ alkyl range, i.e., $RC_6H_4SO_3Na$. The aqueous solution used for foam production contained 0.9 weight percent of the sulfonate. The ammoniated foaming solution contained in addition 0.50 weight percent of ammonia. The results obtained are listed in Table I following.

TABLE I

| Ratio, g./l.[1] | Back pressure, p.s.i.g. | | Advantage, percent [3] |
|---|---|---|---|
| | Std. foam[2] | Foam+NH₃ | |
| 100 | 2 | 1.5 | 25 |
| 50 | 3 | 2 | 33 |
| 33 | 8 | 4 | 50 |
| 25 | 11 | 5 | 45 |
| 20 | 13 | 9 | 31 |
| 10 | | 18 | |

[1] Std. cubic feet per min./gallons per minute.
[2] No ammonia added.
[3] Decrease in back pressure due to added ammonia.

The above data establish that the presence of unneutralized ammonia in a foam markedly reduces the work required for its circulation. A further notable advantage is that ammonia addition enables one to circulate foams having relatively low gas to liquid ratios. These foams contain relatively large amounts of liquid, are relatively dense, and hence are heavy duty foams capable of lifting (circulating out of a well) heavy loads of liquid and/or solids. A still further advantage of the ammoniated foams is their excellent foam stability at low (~5 to 20) gas to liquid ratios.

EXAMPLE 2

Example 1 was repeated using the non-ammoniated foam except that a portion of diesel fuel was introduced into the lower section of element 51 of FIG. 3. Upon making contact with the diesel fuel, the foam immediately collapsed, but with continued introduction of foam eventually the foam persisted and the diesel fuel was circulated out of the unit.

When the same foaming system is used except that unneutralized ammonia is added, the foam does not collapse upon contact with diesel oil. Similarly, at higher temperatures, for example at a foam temperature as high as 290° F., diesel fuel did not suppress the foam. It readily unloaded the oil from element 51 by foam circulation.

These examples demonstrate the effect of unneutralized ammonia as a stabilizer for foams both in regard to contaminants and in regard to elevated temperatures.

EXAMPLE 3

Example 1 was repeated except that the temperature of the heat exchanger, 50, was 350° F. In this case the back pressure for the ammoniated foam on the average was at least 20 percent less than that for the standard non-ammoniated foam.

EXAMPLE 4

The sodium salt of an alpha-olefin sulfonate mixture (prepared from $C_{15}$–$C_{18}$-alpha-olefin molecular weight range) containing unneutralized ammonia was tested as in Example 1. The foam temperature was in the range 186–194° F. Two foaming agent concentrations, 0.11 and 0.22 gram of sulfonate per 100 grams of foaming solution, were used. As indicated below 0.5 gram of ammonia per 100 grams of solution was added. In Table II following is listed the comparative data.

TABLE II

| G./l. ratio s.c.f./gal. | Back pressure, p.s.i.g. | | | Foam characteristics | | | |
|---|---|---|---|---|---|---|---|
| | 0.22% Na salt | | 0.11% Na salt +0.5% NH₃ | 0.22% Na salt | | | 0.11% Na salt +0.5% NH₃ |
| | No NH₃ | +0.5% NH₃ | | No NH₃ | +0.5% NH₃ | | |
| 20 | 8 | 3.5 | 3.5 | FO,¹ slumpy | FO, poor, wet | | FO, poor, wet. |
| 13.3 | 12 | 6.5 | 4.5 | FO, stiff-stable | FO, fair, wet | | FO, fair, slumpy. |
| 10 | 21–25 | 7.5 | 5.5 | FO, very stiff and stable. | FO, good, slumpy | | Do. |
| 6.7 | Plugging | | 9 | 6 | FO, good, standing | | FO, fair, dry. |
| 5 | | | 10 | 7 | FO, excellent, peaking | | FO, good, dry. |

EXAMPLE 5

Example 4 was repeated except that the ammonium salt of the alpha-olefin sulfonate was the foam agent used with and without added ammonia. The results in this run, together with the comparative data for the corresponding sodium salt run, are listed in Table III below.

TABLE III

| G./l. ratio | Back pressure, p.s.i.g. | | | |
|---|---|---|---|---|
| | 0.11% Na salt alone | 0.11% NA salt +0.5% NH₃ | 0.11% NH₄ salt +0.5% NH₃ | 0.11% NH₄ salt alone |
| 20 | 4.5 | 3.5 | 3 | 5–6 |
| 13.3 | 5 | 4.5 | 5 | 7–8 |
| 10 | 5.5 | 5.5 | 5.5 | 11 |
| 6.7 | 6 | 6 | 5.5 | 17–20 |
| 5 | 6.5 | 7 | 5.5 | |

The nature of the foam produced by the ammonium salt ranged from fair to excellent over the g./l. ratio tested, i.e., 5 to 20. In general the ammonium salt derived foam was of superior quality relative to the corresponding sodium salt. Both are outstanding agents for use in producing aqueous gas-in-liquid foamed well circulation fluids.

The data demonstrate that for foams in the high density heavy duty range, i.e., where the gas-to-liquid ratio is below about 10, the above ammonium salts are unique. In the g./l. ratio range 5–10, the back pressure for the salts is remarkably low, 5.5 p.s.i.g and is constant. These characteristics are especially desirable for foamed well circulation fluids.

These data demonstrate, as in the case of the foregoing examples, that the presence of unneutralized ammonia in a foam produced from the ammonium salt of an alpha-olefin sulfonate substantially improves the flow characteristics for the modified foam system.

EXAMPLE 6

In this example the foaming agent used was of the formula $R(OCH_2CH_2)_3OSO_3NH_4$, i.e., an ammonium salt of an ethoxylated alcohol half ester. R in the formula is a $C_{12}$ or $C_{13}$ alkyl group and agent is an approximately 50/50 molecular mixture. The conditions except for the foregoing were those of Exampe 1. Runs with and without added and unneutralized ammonia yielded the following results:

TABLE IV

| G./l. Ratio | Back pressure, p.s.i.g. | |
|---|---|---|
| | NH₄ salt ¹ | NH₄ salt +0.5% NH₃² |
| 100 ³ | 1–2 | |
| 50 | 2–3 | |
| 33.3 | 3–4 | |
| 25 | 5–6 | |
| 20 | 8–9 | 4.5 |
| 13.3 | 12 | 6.5 |
| 10 | ⁴ 25–30 | 13.5 |
| 6.7 | (⁴) | ⁵ 20 |
| 5 | (⁴) | ⁵ 20 |

¹ 0.3 gr. of sulfonate per 100 gr. of solution.
² 0.15 gr. of sulfonate per 100 gr. of solution+0.5 gr. of ammonia.
³ No foam over until g./l. ratio about 25.
⁴ Unit plugging from excessive back pressure build-up.
⁵ The foam was excellent, and flow was free of difficulties.

In the above lists the ammonia modified foams were fair to excellent foam and in general markedly superior to the corresponding unmodified foam. The fact that the ammoniated foams were obtained by the use of but one-half the amount of foaming agent further demonstrates the stabilizing effect of the unneutralized ammonia upon the subject foams.

Again, the presence of unneutralized ammonia in the foam in the case of the above ethoxylated sulfate half-esters, as in the case of analogous sulfato-type foamers, markedly improves foam characteristics. The relative advantage ranged from 46 to 55 percent in the above comparisons.

EXAMPLE 7

In this run a molecular and species mixture was used. Two parts by weight of the mixture was a sulfonate of a $C_{13}$–$C_{27}$-alpha-olefin derived benzene alkylate (average molecular weight 350). One part by weight was a sulfonate of a highly branched polypropylene pentamer sulfonate. In each case the sodium salt was used. The foamable solution contained 0.34 weight percent of the sulfonate mixture and 0.5 weight percent of unneutralized ammonia. The conditions were as in Example 3. In the g./l. ratio range 20 to 5, the foam varied from good to excellent. At the g./l. ratios 20, 13.3, 10, 6.7 and 5 the back pressures were 3.5, 5.5, 7, 8.5 and 9, respectively. When ammonia was omitted from the solution, the back pressures were substantially higher.

The above data demonstrate that the use of molecular and/or specie mixtures as well as the presence of unneutralized ammonia promotes favorably low circulation back pressures (compare Examples 1 and 7).

EXAMPLE 8

This example was carried out as in Example 1 except that the foaming agent was the ammonium salt of a linear alkyl benzene sulfonate ($RSO_3NH_4$ in which R was a $C_{11}$–$C_{14}$ alkyl group mixture). Sufficient ammonia was added to yield a solution pH of 0.9. At g./l. ratios of 25 20, 13 and 10, the back pressures were 3, 4, 8.5 and 10, respectively. The foam quality ranged from poor (g.l. ratio of 25) to excellent (g./l. ratio 13 to 10). When diesel oil was introduced, the foam persisted and readily carried the oil out of the unit.

EXAMPLE 9

This example was a simulated clean-out of a packed liner. In the unit of FIG. 3 a small diameter plastic bead pack saturated with 13.5° API gravity crude oil was used to approximate a gravel packed liner or an analogous bottom hole producing zone condition. The conditions were as follows:

Foaming agent _____ Same as in Example 8 (1%).
G./l. ratio, s.c.f./g. _____ 13.3.
Bath temp., °F. _____ 300.
Back pressure, p.s.i.g.: ____
    Clean beads _____ 8.5.
    Beads and crude oil __ 9.5–10.5.
Ammonia _____ As required.

| Foam flow, time, min. | Remarks, Foamable Solution, pH | |
| --- | --- | --- |
| | 8 | 9.5 |
| 0 | 9.5 p.s.i.g. back pressure. | 8.5 p.s.i.g. back pressure. |
| 1 | Foam through pack very dark. | 10 p.s.i.g., beads visible, foam very dark brown emulsion better than at pH 8. |
| 1.5 | Foam medium brown. | |
| 2 | Oil removed to outside of beads foam streaked brown, p.s.i.g. of 8.5; oil ring at bottom. | Oil removed to outside, p.s.i.g. of 8; oil ring at bottom. |
| 5 | 10% diesel oil to foam: Foam clear: part of oil ring removed; excellent. | P.s.i.g. of 7.5, pack cleaned except for bottom oil ring. |
| 8 | | 10% diesel oil to foam: p.s.i.g. 8.5; foam very stable: Some of oil ring removed. |
| Total run | 14 | 15. |

At end of time indicated, the bead packs were opened up and visually inspected. The pack treated at pH 9.5 was the cleaner of the two.

The oil water emulsions produced from the foam-crude oil in the above examples broke readily upon standing or from treating by conventional means.

These examples demonstrate that foam and foam-diesel oil mixtures are effective agents in the subject foam circulation system for the removal of heavy crude oil from oil well surfaces and packings.

When sodium hydroxide is added to a well circulation foam as in the above examples, together with the ammonia, stronger emulsions and better cleaning action results.

EXAMPLE 10

In this test a new well located in the Kern River Field was conditioned using a foam circulation fluid prior to placing the well in production. A 9⅞" hole was drilled by conventional means to a depth of 750 feet using a gel water mud. A 7" casing string was then cemented in at a depth of 750 feet, and the well was perforated using a jet perforator. Four ¼" holes per foot were placed in the 646 to 666 and 694 to 716 foot interals. The indicated top of the fluid level in the well was at 650 feet. The rods and tubing were pulled and the well was rigged, substantially as described in FIG. 2 and included provision for foam circulation together with a bit. A 5½" O.D. bit was run to a depth of 736 feet (the effective depth) and the accumulated solids, oil and water were unloaded from the well by foam circulation. The foam gas-to-liquid ratio was about 24.

The foaming agent used in this example was the ammonium salt of an alcohol ethoxy sulfate mixture of the formula $RO(CH_2CH_2O)_nSO_3NH_4$ in which R is in the range $C_{12}$–$C_{13}$, inclusive, and $n$ is in the range 3–5, inclusive. About ½ volume percent each of the foamer and concentrated ammonia (~28% by weight) were used in making up the aqueous solution. The foam was preformed at the surface and out of contact with the well environment.

The bit was then pulled and replaced with a two-cup opposed swab cup washer having 8" cup spacing. The perforations from 716 to 694 foot level were then washed while foam was circulated. Much sand and some metal from the jet perforation capsules were carried out of the well by the foam. During the washing and foam circulation, the back pressure dropped from 350 p.s.i. at the start to 180 p.s.i. at the end. This pressure drop indicated that the perforations had been freed by the continued washing.

Next the 666 to 644 foot interval was similarly treated. However, when the 350 p.s.i. maximum pressure which was available was applied, it was not possible to establish foam circulation. The washer was pulled and examined. Extensive sandblast streaks on the tubing established that a great deal of sand was being delivered into the well bore under high pressure via the cleaned perforations in the interval 716–694 feet.

After standing shut-in for about 12 hours, the well bore was found to have filled with sand to the 702 foot level, i.e., about 34 feet of fill had accumulated. A 5½" O.D. bit was again run in and the 34 feet of sand fill was foamed out. The two-cup washer was again installed and run into the well together with 1,000 gallons of aqueous acid containing 7.5 volume percent of hydrochloric acid and 2.5 volume percent of hydrofluoric acid, together with a corrosion and sludge inhibitor. This acid mixture was spotted in the well as follows: (1) 340 gallons in the lower perforated interval (716 to 694 feet); and (2) 660 gallons in the upper perforated interval (666 to 644 feet). The acid was displaced at a vacuum in the lower interval whereas a pressure of about 800 p.s.i.g. was required in order to open up the upper perforations. The acid was then displaced at a vacuum. After the acid had been in place for one hour, the upper perforations were washed with foam. The foam was circulated by applying a pressure in the range starting at 350 p.s.i. down to 125 p.s.i. and a gas-liquid ratio, standard cubic feet per gallon, respectively, in the range 20 to 32. In this manner the spent acid was removed from the well, together with large amounts of coarse sand and pebbles.

The cupped washer was pulled and the bit was then reinstalled. During the cleaning of the upper perforation zone, 24 feet of sand fill had accumulated at the well bottom. This fill was circulated out as before using ammoniated foam. After a 12-hour period during which the well was shut-in, a check was again made for accumulated fill. There was none. Finally the well was stimulated with steam and then placed on production. The daily rate was exceptional for the area and for this type of completion, being 60 barrels of oil and 10 barrels of water.

From inspections of the foam returns, a substantial amount of the conventional drilling mud used in drilling the well was removed from the well and presumably from the producing formation face. The cost of the well clean-out using foam relative to the cost for a conventional bailing operation was fractional and the preformed ammoniated foam appears to be at least several orders of magnitude superior to conventional bailing methods in many respects. In particular, the instant dynamic sand removal technique permits superior sand stabilization compared to conventional bailing. This well subsequently produced without incident; whereas other wells completed similarly in this area have had to be bailed many times during equivalent time periods.

An outstanding advantage of the subject foams relative to conventional well clean-out means is the fact that the method is effective for use on wells having diameters in the slim-hole range, i.e., below about 7 inches. It is difficult and at times even impossible to satisfactorily bail a small bore well. Conventional bailing tools are in general unsatisfactory for use in slim bore wells and particularly where a tool has been dropped into a well.

EXAMPLE 11

In a well located in the Poso Creek area of California, a 3⅛" Cavins bailer was lost because sand ran into the well faster than the well could be bailed down. The well depth was approximately 2845 feet and the producing zone in the 2644' to 2845' level. Due to excessive sand entry the pump was pulled up to the 1786 foot level. The pump was run at a slow rate in order to avoid excessive sand entry. Production fell off over a period of about two years until the daily rate was 2 barrels of oil and 34 barrels of water.

The well was then subjected to a foam clean-out and a fish (Cavins bailer plus 31 feet of wireline) recovery was carried out. The top of the fluid in the well was at the 930 foot level and the top of the sand fill was at the 2779 foot level. There were 87 feet of sand fill, and the bailer was located in the bottom portion at about the 2831 foot level.

In this run the same foaming agent and the same amounts of the agent and ammonium were used as in Example 10. The maximum pressure available was 350 p.s.i. at the well head. The pressure employed to circulated the foam was in the range 130 to 350 p.s.i.

After pulling the pump and associated elements a 4½″ bit was attached to a pipe string and run into the well. The unit was fitted for foam circulation. The well was unloaded without incident in stages by circulation of the ammoniated foam down to the top of the fill at the 2779 foot level. Circulation was continued and the foam readily carried out the sand fill. It was very fine and silt-like. At about the 2783 foot level the top of bailer fish was encountered. The well was then shut in overnight.

The string was pulled the following morning, the bit removed, and a 4½″ wash pipe was run into the well. The accumulated fluids were again unloaded in stages using foam down to the top of the sand fill. Foam circulation was continued with sand clean-out and washing over of the fish until the 2860 foot level was reached. Except for the bottom shoe door of the bailer, all of unit was recovered. The door apparently had become detached from the bailer during the washover operation.

During the removal of the fill from the perforated well liner (2604–2866 foot level), there was an immediate and substantial increase in the amount of oil being circulated out of the well along with the sand. For the above operation only 13.5 hours of circulation time and approximately 10,000 gallons of foam solution were required to reestablish the well as a producing unit. The present rate is 12 barrels per day (b./d.) oil and 60 b./d. water and the well has produced without incident since the foam clean-out work.

EXAMPLE 12

The efficacy of ammoniated foam as a clean-out fluid was demonstrated in a Kern River, California, well which had become badly clogged with a mixture of viscous crude oil and sand or silt. For about six years this well had been produced using a bottom hole heater. A steam injection treatment temporarily improved the production rate. About five months after the steam treatment, the oil in the well had become so viscous that the pump rods would not drop. Roughly about 117 feet of sand fill had accumulated in the well. Due to the viscosity of the oil, clean-out of the well using a conventional bailer was impracticable.

fill, were removed from the well by circulation of preformed ammoniated foam, making possible a subsequent steam stimulation of the well and its return to production.

EXAMPLE 13

Foam clean-out was tried in a second Kern River, California, well which had been shut in because of poor production due to the high viscosity of the oil and excessive sanding up of the well. As in Example 12 above, foam was used to circulate out the sand and crude oil. The foam return inspections indicated that this concentration of foamer and ammonia had done an excellent job of achieving easily circulatable oil-in-water emulsions of the viscous crude oil. The emulsions readily broke on standing, making crude oil recovery no particular problem.

EXAMPLE 14

Oil production from unconsolidated sand formations is difficult and frequently uneconomical because of heavy sand flow into the well. Because of excessive sand flow into a well in the Taft, Calif., area the well was shut-in and remained so for about three years.

A pipe string as in FIG. 1, together with the associated foam equipment, was then installed in this well. In the manner described in Example 10, the sand fill was removed in large part by circulating preformed ammoniated foam. The foamer used in the clean-out was the ammonium salt of a linear alkylbenzene sulfonic acid mixture of the formula $RC_6H_4SO_3H$ in which R was a $C_{11}$–$C_{14}$ alkyl group mixture. From about 2–3 mols of unneutralized ammonia for each mol of sulfonic acid were present in the foam solution which contained 0.5–1 pound of acid per 100 pounds of solution. Clean-out was accomplished without difficulty. However, sand continued to flow into the well at a large rate. In addition, the produced gas from the cleaned well was found to have a much larger hydrogen sulfide content than formerly. The well was produced intermittently by foam circulation during the day with the well being shut in during the off hours. Thereafter, it was produced over a four-day period by means of continuous foam circulation. In the latter instance the foamer used was the aqueous solution of the sulfated alcohol ethoxylate of Example 10, i.e., ~½% of foamer + ~½% of concentrated ammonia (28 weight percent concentration). The results were as shown in the table below.

| Day of Month | Production | | | Depth 954′ average bottom hole pressure, p.s.i. | Injection Rate | |
|---|---|---|---|---|---|---|
| | Hrs. | Oil, b./d. | Water, b./d. | | Foam Sol., g.p.m. | Air, c.f.m. |
| 3 | 8.8 | 81 | 119 | | 4.4 | 150 |
| 5 | 5.5 | 155 | 58 | | 3.7 | 181 |
| 6 | 4.5 | 166 | 78 | | 5.0 | 226 |
| 7 | 6.0 | ~191 | ~82 | 50 | 4.0 | 155 |
| 13 | 24 | 74 | 34 | 34 | 3.3 | |
| 14 | 24 | ~56 | ~25 | 32 | 2.2 | 19 |
| 15 | 24 | 51 | 8 | 36 | 2.4 | 18 |
| 16 | 24 | 38 | 0 | 38 | 2.1 | 18 |

As in Examples 10 and 11 above, a pipe string and attached bit were run into the well after the pumping elements had been pulled. Also as in Examples 10 and 11, foam was circulated in the well. The viscous oil and sand mixture were readily circulated out of the well. Inspection of the foam returns indicated that the ammoniated foam was causing the viscous oil to emulsify and rendered it easily transportable via the foam to the surface.

At one point in the operation, circulation was lost and the back pressure became excessive. The string was pulled up and about 50 feet in the well and circulation was reestablished. It appeared that sand heaving in the well or possibly a fast ingress of sand into the well had occurred to such an extent that circulation was lost. In any event, with continued foam circulation and the advancing of the string down the well, the viscous oil and sand or silt were cleared from the well to within about 12 feet of the bottom. In all, roughly 175 barrels of formation fluid, as well as about 117 feet of accumulated sand During the foam lift production, the hydrogen sulfide was effectively neutralized by the foam. Consequently there was no safety hazard to operating personnel because of this noxious gas.

After the extensive foam circulation and sand removal, the well appeared to have a reasonably stabilized sand screen. Sand inflow appeared to be small or negligible. The pump was replaced in the well and production continued.

This example demonstrated that ammoniated preformed foam can be circulated and used as an effective means to recover liquids or solids, or both from a well. It demonstrated that ammoniated foam can be used to suppress noxious acidic gases. This well has produced without incident or well pulling since the above sand stabilization.

EXAMPLE 15

As in the foregoing examples, ammoniated preformed foam was used in an oil well except that (1) diesel oil solvent or (2) aqueous ammonia and (3) aqueous sodium hydroxide solution was spotted in the well and the solutions were transported up the well in a reflux flow. This was accomplished by reducing the rate of foam delivery to the well to a point where no foam returns are delivered to the surface or by reducing the foamer and ammonia concentration or by a combination of reduced flow rate and concentration. Under these conditions the foam appears to break in an area part way up the well bore and the solvent or caustic which has been carried upward by the foam drains downward to wash and treat the lower part of the well. By varying the foam delivery rate, the lower portion of the well bore and in particular the producing formation face can be treated by caustic and hydrocarbon solvent.

When it is desired to terminate the treatment flow rates and/or concentration of the foamer and ammonia are adjusted and full circulation is achieved. The hydrocarbon solvent or caustic solution is then carried out of the well by the foam.

EXAMPLE 16

In this example a multiple string of small diameter pipe was struck in place in a well having an 8⅝ inch casing. The multiple string consisted of one 2″ O.D. string pipe and two strings of ¾″ O.D. pipe. The sticking was caused by unconsolidated sand which filled the well from a depth of 1000 feet to 1189 feet, i.e., a 189 foot column of sand around the multiple string. For a period of about 50 hours, a conventional hoist was used in the effort to dislodge the sanded-in pipe. It could not be budged. A ¾″ O.D. wash pipe string was then lowered to the 1000 foot depth and foam circulation was started as in the previous examples. The foam readily removed the sand from around the three small strings. As the sand was removed, the wash pipe string was lowered to a deeper depth. Only 4½″ hours of foam circulation were required to remove the sand. The tubing strings were then hoisted out of the well in the conventional manner without difficulty.

EXAMPLE 17

Slim hole clean-out

A well having a 2⅞″ O.D. tubing string which was perforated for production in the 962 to 998 foot depth interval became partially filled with unconsolidated sand. A portion of the sand was removed using a conventional wire bailer down to a depth of 933 feet. At this point the bailer could not be lowered further. Water was then circulated, but little or none of the sand was carried out by this means. A 1.66″ O.D. tubing string was then lowered into the well. An ammoniated gas-in-liquid foam as described in Example 14 was circulated in the well. Sand and oil readily circulated out of the well down to the 960 foot depth without difficulty or incident. At this point it was found that the 2⅞″ tubing string was so damaged as to be useless, and the foam circulation was discontinued.

It will be readily appreciated from the foregoing disclosure and examples that variations can be made by those skilled in the art without departing from the scope and spirit of the appended claims.

We claim:

1. In the use of a gas-in-liquid foam as a circulation fluid in a well, the improvement which comprises generating said foam out of contact with the well environment and incorporating in said foam in parts by weight based upon the liquid component thereof from about 0.05 to 10 parts of ammonia per 100 parts of said liquid, thereby substantially reducing the energy requirement for said use.

2. The improvement as in claim 1 wherein said use is in connection with the recovery of minerals selected from the group consisting of oil, gas, and mixtures thereof.

3. The improvement as in claim 1 wherein said foam is an aqueous foam.

4. In the use of a gas-in-liquid foam as a circulation fluid in a well, the improvement which comprises generating said foam out of contact with the well environment and incorporating in said foam sufficient ammonia to adjust the pH thereof to a value in the range from about 7.5 to 9.

5. In the use of a gas-in-liquid foam as an operational fluid in the recovery of subterranean deposits by means of a well, the improvement which comprises generating said foam out of contact with said well environment prior to its use as a fluid, and adding to the foam from about 0.05 to 10 parts by weight of unneutralized ammonia per 100 parts of said fluid, thereby substantially reducing the work required for said use.

6. The improvement as in claim 5 wherein said foam is an aqueous foam.

7. The improvement as in claim 5 wherein said use is in connection with the recovery of mineral selected from the group consisting of oil, gas, and mixtures thereof.

8. In the use of a gas-in-liquid foam as an operational fluid in the recovery of substerranean deposits by means of a well, the improvement which comprises generating said foam out of contact with said well environment prior to its use as a fluid, and adding to the foam sufficient ammonia to adjust the pH thereof to a value in the range from about 7.5 to 9.

9. The foamed well circulation fluid composition consisting essentially of a foam selected from the group consisting of gas-in-water foams obtained by foaming an aqueous solution containing in parts by weight from about 0.05 to 1 part of a foaming agent of the formula

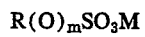

wherein R is a radial selected from the group consisting of radicals R′ and radicals of the formula

wherein R is a radical selected from the group consisting from about 8 to 26 carbon atoms and wherein $n$ is a number in the range 1 to 15, $m$ is zero or 1 and M is a cation selected from the group consisting of ammonium or alkali metal cations and mixtures thereof; from about 0.05 to 10 parts of unneutralized ammonia and from about 89 to 99 parts of water, and wherein said gas is selected from the group consisting of air, nitrogen, methane, ethane and mixtures thereof.

10. The composition of claim 9 wherein said gas is air, and wherein $m$ of said formula is zero.

11. The composition as in claim 10 wherein said foam has a gas-to-liquid volume ratio, standard cubic feet per gallon, respectively, in the range from about 1 to 50.

12. The composition of claim 11 wherein the anion of said agent is a sulfonate ion of the formula $RC_6H_4SO_3^-$ wherein R is a hydrocarbon radical selected from the group consisting of alkyl groups containing from about 10 to 20 carbon atoms.

13. The composition of claim 11 wherein the anion of said agent is a sulfonate ion of the formula $RSO_3^-$ wherein R is selected from the group consisting of alkyl radicals containing from about 8 to 20 carbon atoms.

14. The composition of claim 11 wherein the anion of said agent is a sulfonate ion of the formula $RSO_3^-$ wherein R is selected from the group consisting of alkenyl radicals containing from about 8 to 20 carbon atoms.

15. The composition as in claim 10 wherein said foam has a gas-to-liquid volume ratio, standard cubic feet per gallon, respectively, in the range from about 5 to 20.

16. The foamed well circulation fluid composition consisting essentially of a foam selected from the group consisting of gas-in-water foams obtained by foaming an aqueous solution containing in parts by weight from about 0.05 to 1 part of a foaming agent of the formula $$R(O)_m SO_3 M$$

wherein R is a radical selected from the group consisting of radicals R' and radicals of the formula $$R''O(CH_2CH_2O)_n$$

wherein R' and R" are hydrocarbon radicals containing from about 8 to 26 carbon atoms and wherein $n$ is a number in the range 1 to 15, $m$ is zero or 1 and M is a cation selected from the group consisting of ammonium or alkali metal cations and mixtures thereof; from about 89 to 99 parts of water; and sufficient unneutralized ammonia to yield a pH in the range from about 7.5 to 9; and wherein said gas is selected from the group consisting of air, nitrogen, methane, ethane and mixtures thereof.

17. The composition as in claim 16 wherein said gas is air, wherein $m$ of said formula is zero, and wherein said foam has a gas-to-liquid volume ratio, standard cubic feet per gallon, respectively, in the range from about 1 to 50.

18. The composition of claim 17 wherein the anion of said agent is a sulfonate ion of the formula $RC_6H_4SO_3^-$ wherein R is a hydrocarbon radical selected from the group consisting of alkyl groups containing from about 10 to 20 carbon atoms.

19. The composition of claim 17 wherein the anion of said agent is a sulfonate ion of the formula $RSO_3^-$ wherein R is selected from the group consisting of alkyl radicals containing from about 8 to 20 carbon atoms.

20. The composition of claim 17 wherein the anion of said agent is a sulfonate ion of the formula $ROS_3^-$ wherein R is selected from the group consisting of alkenyl radicals containing from about 8 to 20 carbon atoms.

21. The method of stabilizing an unconsolidated oil sand in a producing formation in a well which comprises circulating a preformed aqueous gas-in-liquid foam in the well, thereby removing loose sand from said formation and developing a substantially consolidated residual sand-pack in the formation.

22. The method in claim 21 wherein said foam is an ammoniated foam.

23. The method in claim 21 wherein said foam contains from about 0.05 to 10 parts by weight, based upon said foam, of unneutralized ammonia.

24. The method as in claim 21 wherein sufficient ammonia is present in the foam to give it a pH in the range from about 7.5 to 9.

25. The foamed well circulation fluid composition consisting essentially of a foam selected from the group consisting of air-in-water foams obtained by foaming an aqueous solution containing in parts by weight from about 0.05 to 1 part of an olefin sulfonate selected from the group consisting of alkali metal or ammonium salts of alpha-olefin sulfonates containing from about 10 to 20 carbon atoms, internal olefin sulfonates containing from about 10 to 20 carbon atoms, and mixtures thereof; from about 0.05 to 10 parts of unneutralized ammonia and from about 89 to 99 parts of water; wherein said foam has an air-to-liquid volume ratio, standard cubic feet per gallon, respectively, of from about 1 to 50.

26. In the use of a foam as a circulation fluid in a well wherein said foam is produced from air and an aqueous solution containing from about 0.005 to 10 parts of a foaming agent selected from the group consisting of organic foaming agents having a Ross-Miles foam height of at least 10 centimeters and a cumulative foam height of at least 30 centimeters, the improvement which comprises generating said foam out of contact with the well environment and incorporating in said foam in parts by weight based upon the liquid component thereof from about 0.05 to 10 parts of ammonia per 100 parts of said liquid, thereby substantially reducing the energy requirement for said use.

27. The use as in claim 26 wherein said foam is an elastic foam.

28. The improvement as in claim 26 wherein said use is in connection with the recovery of minerals selected from the group consisting of oil, gas, and mixtures thereof.

29. In the use of a foam as a circulation fluid in a well wherein said foam is produced from air and an aqueous solution containing from about 0.005 to 10 parts of a foaming agent selected from the group consisting of organic foaming agents having a Ross-Miles foam height of at least 10 centimeters, and a cumulative foam height of at least 30 centimeters, the improvement which comprises generating said foam out of contact with the well environment and incorporating in said foam sufficient ammonia to adjust the pH of the foam to a value in the range from about 7.5 to 9, thereby substantially reducing the energy requirement for said use.

30. The improvement as in claim 29 wherein said use is in connection with the recovery of oil or gas.

31. The use as in claim 29 wherein said foam is an elastic foam.

32. Method of cleaning an oil well which comprises circulating in the well a preformed and ammoniated air-in-water foam.

33. The method as in claim 32 wherein diesel oil is circulated in the well by the foam.

34. In the drilling of a well wherein a drilling fluid is employed to remove cuttings, the improvement which comprises using a preformed ammoniated air-in-water foam as said fluid wherein said foam is circulated at a velocity in the range from about 5 to 800 feet per minute.

35. The method as in claim 34 wherein said velocity is in the range from about 5 to 300 feet per minute.

36. In the recovery of crude oil by means of a well wherein the oil is removed from the producing zone by a mechanical means, the improvement which comprises circulating a preformed ammoniated air-in-water foam in said well thereby carrying said oil to the well head and recovering said oil.

37. The foamed well circulation fluid composition consisting essentially of a foam selected from the group consisting of gas-in-water foams obtained by foaming an aqueous solution containing in parts by weight from about 0.05 to 1 part of a foaming agent of the formula $RO(CH_2CH_2O)_y SO_3 M$ wherein R is an alkyl radical containing from about 8 to 18 carbon atoms, $y$ is an integer in the range 3 to 10, inclusive, and M is a cation selected from the group consisting of ammonium and alkali metal cations, and mixtures thereof; from about 0.05 to 10 parts of unneutralized ammonia and from about 89 to 99 parts of water, and wherein said gas is selected from the group consisting of air, nitrogen, methane, ethane and mixtures thereof.

38. The composition of claim 37 wherein said gas is air.

39. The composition of claim 38 wherein said foam has a gas-to-liquid volume ratio, standard cubic feet per gallon, respectively, in the range from about 1 to 50.

40. The composition of claim 38 wherein said foam has a gas-to-liquid volume ratio, standard cubic feet per gallon, respectively, in the range from about 5 to 20.

References Cited

UNITED STATES PATENTS

| | | | |
|---|---|---|---|
| 3,130,798 | 4/1964 | Schramm et al. | 175—71 X |
| 3,136,361 | 6/1964 | Marx | 166—308 |

(Other references on following page)

References Cited

| | | | |
|---|---|---|---|
| 3,269,468 | 8/1966 | Phansalkar et al. | 175—71 |
| 3,313,362 | 4/1967 | Schneider | 175—71 |
| 3,323,593 | 6/1967 | Foshee et al. | 175—69 X |
| 3,330,346 | 7/1967 | Jacobs et al. | 166—274 X |
| 3,391,750 | 7/1968 | Zika | 166—309 X |
| 3,392,782 | 7/1968 | Ferrell et al. | 166—275 |
| 3,410,344 | 11/1968 | Cornelius | 166—309 X |

STEPHEN J. NOVOSAD, Primary Examiner

U.S. Cl. X.R.

166—275, 308, 309, 312, 314; 175—69; 252—8.5

UNITED STATES PATENT OFFICE
CERTIFICATE OF CORRECTION

Patent No. 3,486,560      Dated December 30, 1969

Inventor(s) Stanley O. Hutchison, Glen W. Anderson, and John C. McKinnell

It is certified that error appears in the above-identified patent and that said Letters Patent are hereby corrected as shown below:

Col. 4, line 6, "os" should read --as--.
Col. 4, line 21, "nanacidic" should read --nonacidic--.
Col. 4, line 27, "Rather amounts" should read --Rather large amounts--.
Col. 5, line 20, "formable" should read --foamable--.
Col. 6, line 7, "forming" should read --foaming--.
Col. 6, line 20, " $R'O(CH_2CH_2O)\text{---}m$ " should read -- $R'O(CH_2CH_2O)\overline{m}$ --
Col. 6, line 64, "$S_3$" should read --$SO_3$--.
Col. 7, line 9, "$n\text{-}C_{10}\text{-}H_{21}SO\text{---}_8$" should read --$n\text{-}C_{10}\text{-}H_{21}SO_{\overline{3}}$--.
Col. 7, line 9, "$n\text{-}C_{10}\text{-}C_{15}SO_3$" should read --$n\text{-}C_{10}\text{-}C_{15}\ SO_{\overline{3}}$--.
Col. 7, line 10, "$n\text{-}C_8H_{15}(OCH_2CH_2)_3OSO\text{--}_3$" should read -- $n\text{-}C_8H_{15}(OCH_2CH_2)_3OSO_{\overline{3}}$ --.
Col. 7, line 29, "octylphenoxyethaols" should read --octylphenoxyethanols--.
Col. 7, line 48, "extended" should read --exited--.
Table II, footnote 1 missing. Should read:
Cols. 9-10    -- [1]Foam-Over, i.e., circulated out of simulated well, unit 51 via discharge line 53.--
Col. 9, line 57, "Exampe" should read --Example--.
Col. 10, line 54, "0.9" should read --9.0--.

Col. 11, line 39, "interals" should read --intervals--.
Col. 13, lines 2-3, "circulated" should read --circulate--.
Col. 13, line 67, "up and about" should read --up about--.

[Continued on Page 2]

PO-1050
(5/69)

UNITED STATES PATENT OFFICE
CERTIFICATE OF CORRECTION

Patent No. 3,486,560                     Dated December 30, 1969

Inventor(s) Stanley O. Hutchison, Glen W. Anderson, and John C. McKinnell

It is certified that error appears in the above-identified patent and that said Letters Patent are hereby corrected as shown below:

PAGE 2

Col. 15, line 3, "reflux flow" should read --reflux type flow--.

Col. 15, line 24, "struck" should read --stuck--.

Claim 8, Col. 16, line 23, "substerranean" should read --subterranean--.

Claim 9, Col. 16, line 7, "radial" should read --radical--.

line 42, "R is a radical selected from the group consisting" should read --R' and R" are hydrocarbon radicals containing--.

Claim 12, Col. 16, line 57, "$RC_6H_4SO\text{---}_3$" should read --$RC_6H_4SO_3^-$--.

Claim 13, Col. 16, line 62, "$RSO\text{---}_3$" should read --$RSO_3^-$--.

Claim 14, Col. 16, line 66, "$RSO\text{---}_3$" should read --$RSO_3^-$--.

Claim 18, Col. 17, line 28, "$RC_6H_4SO_3\text{---}_3$" should read --$RC_6H_4SO_3^-$--.

Claim 19, Col. 17, line 32, "$RSO\text{---}_3$" should read --$RSO_3^-$--.

Claim 20, Col. 17, line 37, "$ROS\text{---}_3$" should read --$RSO_3^-$--.

Signed and sealed this 16th day of May 1972.

(SEAL)
Attest:

EDWARD M. FLETCHER, JR.
Attesting Officer

ROBERT GOTTSCHALK
Commissioner of Patents